United States Patent [19]
Erickson

[11] Patent Number: 4,702,489
[45] Date of Patent: Oct. 27, 1987

[54] APPARATUS FOR LIFTING AN END OF A HITCH

[76] Inventor: Norton J. Erickson, 1250-13th St. NW., New Brighton, Minn. 55112

[21] Appl. No.: 780,657

[22] Filed: Sep. 26, 1985

[51] Int. Cl.⁴ .............................................. B60D 1/10
[52] U.S. Cl. ................................ 280/479 A; 172/319; 172/326; 280/515
[58] Field of Search ............... 280/479 R, 479 A, 508, 280/515, 477, 478 R, 423 A, 425 R; 172/319, 326, 680

[56] References Cited

U.S. PATENT DOCUMENTS 2,968,494  1/1961  Klouda ...................... 280/479 A X
3,649,048  3/1972  Garnett ...................... 280/479 R X
3,856,331  12/1974  Bogdanovich .................. 280/479 R
4,288,091  9/1981  Umeda et al. .............. 280/479 R X
4,368,899  1/1983  Smalley et al. ............. 280/479 R X
4,482,166  11/1984  Van Antwerp ................. 280/508 X
4,509,768  4/1985  Haug ............................... 280/479 R Primary Examiner—John J. Love
Assistant Examiner—Charles R. Watts
Attorney, Agent, or Firm—Merchant, Gould, Smith, Edell, Welter & Schmidt

[57] ABSTRACT

The present invention is directed to an apparatus for engaging and lifting the end of a hitch resting on the ground. The apparatus is particularly useful when attached to a yard tractor used for moving trailers or trailer dollys about a parking yard. The apparatus includes a rigid member pivotally attached to a frame attached to the yard tractor. The free end of the rigid member has a plate for scooping under the end of the hitch. A hydraulic actuator remotely rotates a pin into engagement with the end of the hitch. Another actuator pivots the rigid member upwardly to lift the end of the hitch for subsequent movement of the trailer or dolly.

1 Claim, 5 Drawing Figures 4,702,489

APPARATUS FOR LIFTING AN END OF A HITCH

FIELD OF THE INVENTION

The present apparatus is directed to an apparatus which is preferably attached to a yard tractor and provides for the operator of the yard tractor to remotely engage an end of a trailer hitch resting on the ground, lift it and pull the trailer or front wheel assembly to a new location.

BACKGROUND OF THE INVENTION

Trucking companies commonly have a yard in which numerous trailers are parked for various lengths of time. Many trailers have a removable front wheel assembly, called a "dolly". The dolly ordinarily comprises a frame with a wheel on either side and a hitch in front. The upper portion of the dolly includes some type of mechanism for attaching to the bottom front portion of the trailer.

Yard tractors are used to move trailers from one location to another and, in particular, into a location where they may be parked for some time. Oftentimes, a dolly from one trailer is removed for use on another trailer. Thus, the yard tractors are also used to move the dollys. At the present time, a person must lift the hitch of these dollys for engagegment by a mating device on the yard tractor. Such lifting is the source of many back injuries. The apparatus of the present invention allows the operator of the yard tractor to stay on the tractor and remotely engage and lift the hitch of a dolly.

SUMMARY OF THE INVENTION

The apparatus of the present invention is attached to a self-propelled vehicle, like a yard tractor, and is used to engage and lift an end of a hitch resting on the ground, such as the hitch of a trailer dolly. The apparatus includes a frame and a mechanism for attaching the frame to the vehicle. The apparatus further includes a rigid member pivotally attached to the frame wherein the rigid member includes a mechanism for scooping the end of the hitch off the ground. The apparatus also includes mechanism for remotely pivoting the rigid member with respect to the frame and mechanism, in cooperation with the scooping mechanism, for remotely connecting the hitch and the rigid member.

The present apparatus advantageously allows the operator of a yard tractor or other vehicle to which the apparatus is attached to scoop the end of the hitch off the ground, engage the end of the hitch, and lift the end of the hitch so that the wheeled device, such as the dolly, may be moved about. The operations may be accomplished without the direct intervention of a person; in other words, the operations may be accomplished remotely from the cab of the vehicle.

In a preferred embodiment, the present apparatus includes a plate extending forwardly from the end of the rigid member. The plate can scoop under the end of the hitch resting on the ground. The embodiment also includes a pivotal pin which is movable with an hydraulic cylinder/piston assembly to engage the end of the hitch resting on the scooping plate. The embodiment also includes an hydraulic cylinder/piston assembly for pivoting the rigid member with respect to the vehicle, thereby lifting the end of the hitch. Such components functioning in cooperation advantageously eliminate the need for a person to lift or otherwise maneuver the hitch while engaging it with the pulling vehicle.

When not in use, the rigid member may be advantageously pivoted vertically upwardly against the vehicle, thereby moving it out of the way so that the vehicle may perform other functions.

BRIEF DESCRIPTION OF THE PREFERRED EMBODIMENT

Figure 1:
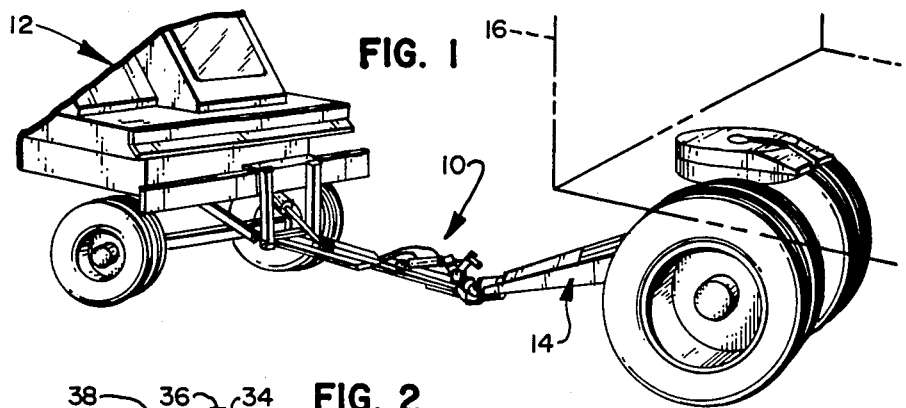
FIG. 1 shows a perspective drawing of apparatus in accordance with the present invention relative to a representative yard tractor and dolly.

Referring now to the drawings wherein like reference numerals designate identical or corresponding parts throughout the several views, and more particularly to FIG. 1, an apparatus in accordance with the present invention is designated generally by the numeral 10. Apparatus 10 is shown in attachment with a yard tractor 12 and further, it is shown ready to engage a dolly 14 from beneath a trailer box 16. Apparatus 10 includes a frame 18 for attachment to vehicle 12 and a rigid member 20 which is pivotally attached to frame 18 for movement by a hydraulic actuator 22. Apparatus 10 further includes a scooping plate 24 attached to the free end of rigid member 20. A pin 26 is pivotally attached to rigid member 20 for movement by a hydraulic actuator 28 to engage in cooperation with plate 24 hitch 30 of dolly 14.

Figure 4:
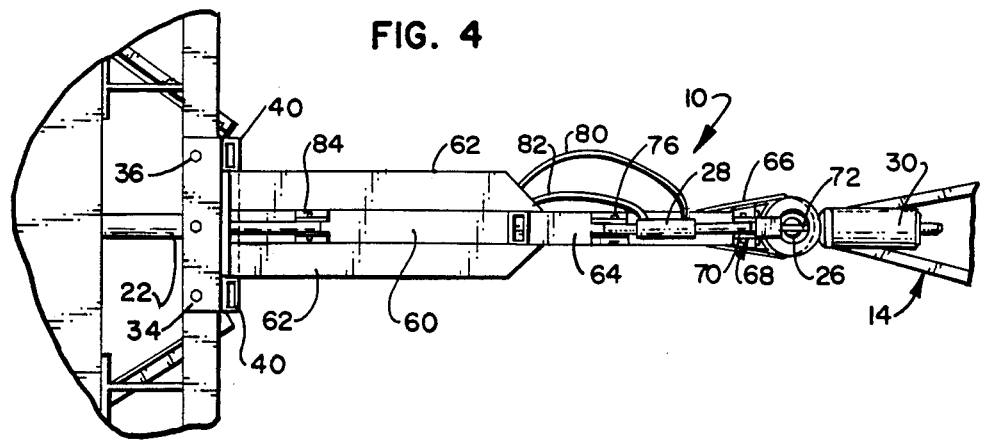
FIG. 4 shows a top plan view of the apparatus.

Representative structure for frame 18 is shown. It is understood that frame 18 may assume a variety of designs depending on the particular type of yard tractor 12 to which apparatus 10 is attached. In the figures, frame 18 includes an angle 32 having a horizontal portion 34 attached with nut and bolt combinations 36 to a member 38 of yard tractor 12. A pair of spaced-apart vertical members 40, such as box tubes, are welded or otherwise attached to the vertical portion 42 of angle 32. A rod 43 extends between and is attached to vertical members 40 near the lower ends of vertical members 40. Rigid member 20 pivots about rod 43. An ear 44 (see FIG. 4) extends at an angle away from each of vertical members 40 toward the rear or opposite end of yard tractor 12 to which frame 18 is attached. Braces 46 extend between ears 44 and tabs 48 fastened to the frame or a part of the frame 50 of yard vehicle 12. Braces 46 provide strength and rigidity to the lower ends of vertical members 40.

Rigid member 20 may be a single component having a cylindrical tube 52 attached at one end to receive rod 42 of frame 18 and having a plate 54 welded or otherwise attached to its bottom side 56 near its free end 58 to extend beyond the free end 58. As shown in the figures, however, rigid member 20 includes a center box tube 60 extending from cylindrical tube 52 to free end 58. A side box tube 62 is welded or otherwise attached on each side of center tube 60 from cylindrical tube 52 for approximately one half the length of center tube 60.

Side tubes 62 provide rigidity and strength. In addition, hoses 80 and 82 may be routed through one of side tubes 62.

A top box tube 64 is welded or otherwise attached to center tube 60 to extend from free end 58 toward the opposite end approximately to the ends of side tubes 62. Top tube 64 also provides rigidity and strength, but in addition provides an appropriate spacing relative to plate 24 for cooperation of the pivot assembly of pin 26 with plate 24.

In this regard, a first pair of angle brackets 66 are attached to the top of top tube 64 by welding or otherwise in a spaced-apart fashion. A bellcrank 68 having legs 70 and 72 at approximately right angles is pivotally attached near its apex with pin 74 to angle brackets 66. Pin 26 is welded or otherwise attached at approximately a right angle from leg 72 which extends toward free end 58 from angle brackets 66. When leg 72 is approximately parallel with top tube 64, pin 26 extends almost down to plate 24. A second pair of angle brackets 76 are welded or otherwise attached in a spaced apart fashion to the top of top tube 64 near the end of top tube 64 opposite free end 58. A hydraulic actuator 78 in the form of an hydraulic piston/cylinder assembly extends between second angle brackets 76 and the end of leg 70 of bellcrank 68. Hoses 80 and 82 lead from opposite ends of the cylinder of actuator 78 and are routed through one of side tubes 62 to control valve 102 (see FIG. 5). Actuator 78 pivots bellcrank 68 to move pin 26 into or out of engagement with an opening in the end of hitch 30 as the end of hitch 30 butts against free end 58 and is supported on scoop plate 24.

Rigid member 20 is pivotal, as discussed, about rod 43 with hydraulic actuator 22. Hydraulic actuator 22 extends between a third set of angle brackets 83 welded or otherwise attached in a spaced apart fashion to the top of center tube 60 just forwardly of tube 52. The other end of actuator 22 is attached to a pair of tabs 86 fastened to frame 50 or an equivalent structure on vehicle 12. Hoses 86 and 88 lead from opposite ends of the cylinder of actuator 22 to control valve 104 (see FIG. 5).

Figure 5:
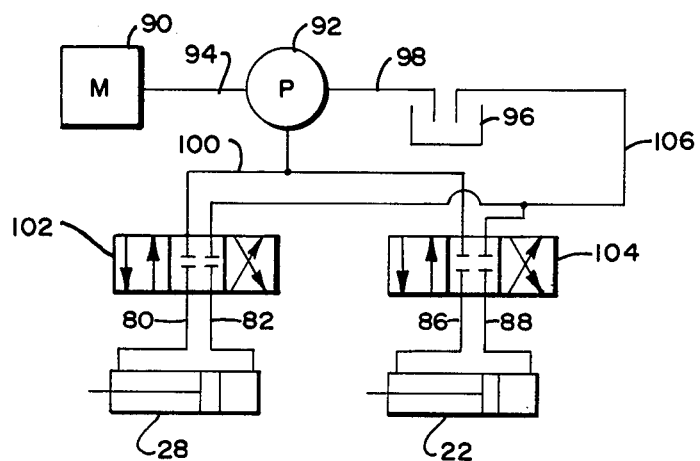
FIG. 5 is a schematic illustration of a representative hydraulic circuit.

A typical control circuit for actuators 22 and 28 is shown in FIG. 5. A motor 90 powers a pump 92 generally by means of a mechanical connection represented by line 94. Pump 92 draws fluid from reservoir 96 via line 98 and pumps the fluid through line 100 to valves 102 and 104 which are plumbed in parallel. Valve 102 is connected via lines 80 and 82 to hydraulic actuator 28. Valve 104 is connected via lines 86 and 88 to actuator 22. Each of valves 102 and 104 is connected through a return line 106 to reservoir 96.

Figure 2:
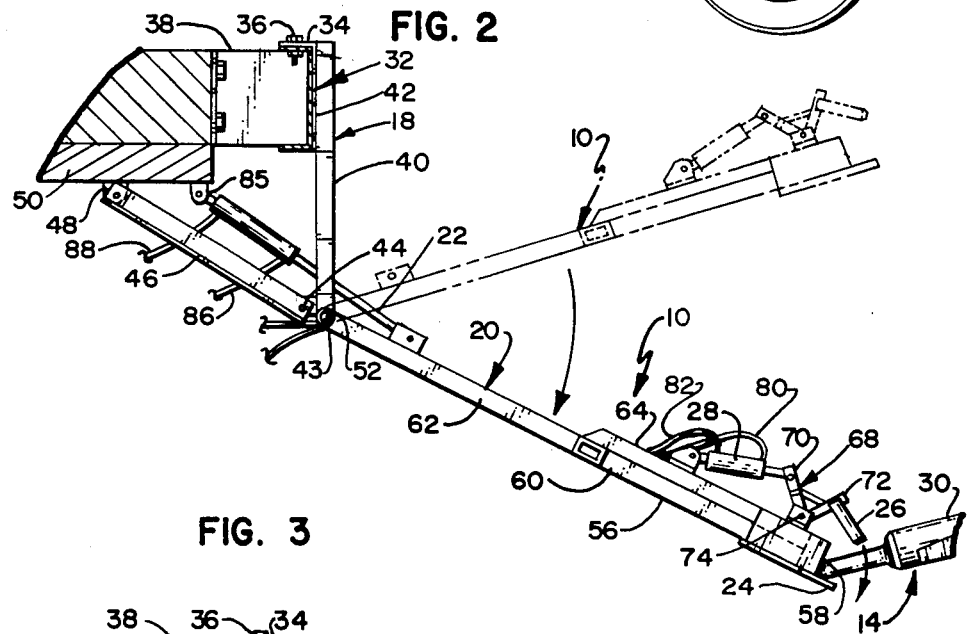
FIG. 2 shows in solid lines a side view of the apparatus in the scooping position and shows in broken lines the apparatus in an upward position before being rotated into the scooping position.
Figure 3:
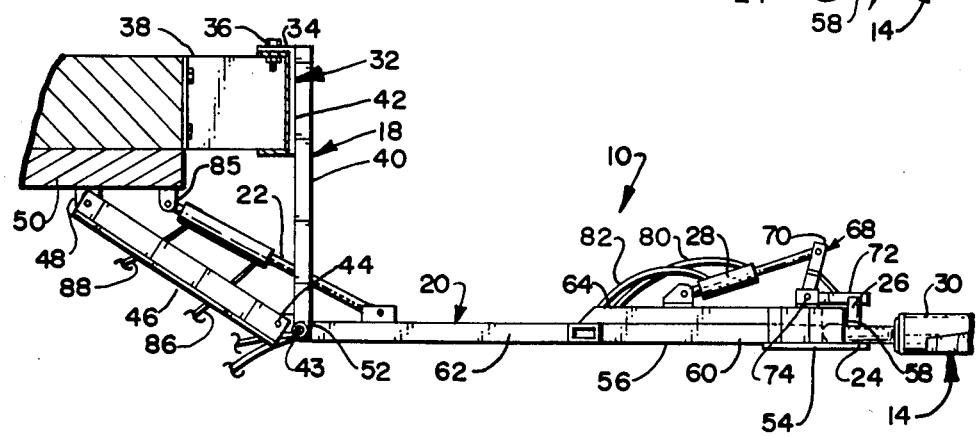
FIG. 3 shows a side view of the apparatus in a position ready for moving the hitched device.

In use, a dolly 14 has a hitch 30 with an end resting on the ground. Yard tractor 12 is driven to a location approaching hitch 30. As depicted in FIG. 2, valve 104, preferably located in the cab or otherwise near the operator, is moved to extend actuator 22 and pivot rigid member 20 downwardly about rod 42. Rigid member 20 is moved downwardly until plate 24 is beneath and in front of the end of hitch 30. Yard tractor 12 is moved toward hitch 30 so that the end of hitch 30 fits on plate 24 and butts against free end 58. Control valve 102, also preferably located in the cab or otherwise near the operator, is then functioned to extend actuator 28 to rotate bellcrank 68 about pin 74 and move pin 26 into an appropriate opening in the end of hitch 30. Pin 26 moves through the opening (not shown) and downwardly toward plate 24 to engage the end of hitch 30.

Control valve 104 is again functioned, but this time to contract actuator 22 thereby pivoting rigid member 20 upwardly and lifting the end of hitch 30. Yard tractor 12 is then moved to pull dolly 14.

Dolly 14 is unhitched by reversing the indicated procedure. Briefly, actuator 22 is extended, actuator 28 is contracted, and yard tractor 12 is moved away from hitch 30 which allows the end of hitch 30 to slide off plate 24 and again rest on the ground. Before moving yard tractor 12 to a new location, actuator 22 is contracted to pivot rigid member 20 upwardly approximately vertically or as far as it will go in the vicinity of member 38.

The structure and function of apparatus 20 has thus been described in detail with respect to a preferred embodiment. The advantages and details as set forth, however, are representative of the concept, and it is understood that the structure may be altered in a number of respects while achieving the same function. Consequently, changes made, especially in matters of shape, size and arrangement to the full extend extended by the general meaning of the terms in which the appended claims are expressed, are within the principle of the invention.

What is claimed is:

1. Apparatus for lifting an end of a hitch, said end resting on the ground, said hitch being attached to a wheeled device, said apparatus being attached to a self propelled vehicle, said apparatus comprising:

a frame;

means for attaching said frame to said vehicle;

a rigid member pivotally attached to said frame, said rigid member having a bottom side and a free end, said rigid member including means for scooping underneath the end of said hitch off the ground, said scooping means including a plate fastened to the bottom side of said rigid member and extending beyond the free end of said rigid member;

means for remotely pivoting said rigid member with respect to said frame; and means in cooperation with said scooping means for remotely connecting said hitch and said rigid member, said connecting means including a pin and means for remotely moving said pin into engagement with said hitch whereby said hitch is supported by said plate and engaged by said pin, said moving means including means for pivotally attaching said pin to said rigid member, said moving means further including a hydraulic actuator attached between said pivotal attaching means and said rigid member and means for energizing said actuator.

* * * * *